United States Patent
Li (10) Patent No.: US 7,697,965 B2
(45) Date of Patent: Apr. 13, 2010

(54) MOBILE PHONE WITH SLIDING KEYPAD INSERTION INTO HOUSING

(75) Inventor: Zheng Li, Shanghai (CN)

(73) Assignee: Inventec Appliances, Taipei (TW)

( * ) Notice: Subject to any disclaimer, the term of this patent is extended or adjusted under 35 U.S.C. 154(b) by 840 days.

(21) Appl. No.: 11/489,554

(22) Filed: Jul. 20, 2006

(65) Prior Publication Data

US 2007/0021160 A1    Jan. 25, 2007

(30) Foreign Application Priority Data

Jul. 20, 2005    (TW)    ............................... 94212248 U (51) Int. Cl.
*H04M 1/00*    (2006.01)
(52) U.S. Cl. .............. 455/575.4; 455/550.1; 455/575.1; 379/428.01; 379/440; 379/339; 379/338; 379/337; D14/137; D14/140; D14/139
(58) Field of Classification Search .............. 455/550.1, 455/575.1, 575.4
See application file for complete search history.

(56) References Cited

U.S. PATENT DOCUMENTS 6,973,186 B2 * 12/2005 Shin ...................... 379/433.12

| | | | |
|---|---|---|---|
| 2002/0137476 A1* | 9/2002 | Shin | 455/90 |
| 2004/0204203 A1* | 10/2004 | Lee | 455/575.1 |
| 2005/0054397 A1* | 3/2005 | Kim et al. | 455/575.4 |
| 2005/0202856 A1* | 9/2005 | Park et al. | 455/575.1 |
| 2006/0084481 A1* | 4/2006 | Tseng et al. | 455/575.1 |

* cited by examiner

*Primary Examiner*—Edward Urban
*Assistant Examiner*—Fayyaz Alam
(74) *Attorney, Agent, or Firm*—Bacon & Thomas, PLLC (57) ABSTRACT

The present invention is to provide a mobile phone comprising a body and a housing. A hollow is formed within the housing and the body is slidably disposed in the hollow. The hollow has an opening in an end of the housing and the other end terminated at a closed end of the housing distal the opening. A display (e.g., LCD (liquid crystal display)) is disposed on a front surface of the housing. The body comprises a circuit board and an input device. The circuit board is installed within the body and comprises electronic circuits and devices for controlling the components of the mobile phone. The input device (e.g., alphanumeric keypad) is disposed on a front surface of the body for operating the mobile phone. The body is capable of being engaged with the housing and being slid towards outside of the hollow through the opening to expose the input device for a user to make a phone call.

8 Claims, 7 Drawing Sheets

MOBILE PHONE WITH SLIDING KEYPAD INSERTION INTO HOUSING

FIELD OF THE INVENTION

The present invention relates to electronic telecommunication devices and more particularly to a mobile phone with improved characteristics.

BACKGROUND OF THE INVENTION

Wireless telecommunication technologies have a rapid, spectacular development in recent several decades, resulting in a great impact to the modern society. One example of a variety of available electronic telecommunication devices is a mobile phone. Features of a mobile phone are advanced gradually and a wide variety of mobile phones are commercially available in a faster pace. Market growth is also significant. And in turn, it makes mobile telephony industry advance greatly. Human life and working modes are thus brought into a revolutionary change. It is estimated that there are more than 1 billion mobile phone subscribers in the world. Modern mobile phones have functions other than only the standard voice function of a telephone. In fact, latest mobile phones can support many additional services such as text messaging, Internet accessing, etc. This is because the mobile phone market is very competitive and the world's largest mobile phone companies want to own a larger share of the global market. It is clear from above and in view of the trend that only those mobile phone companies are capable of providing powerful functions and friendly services can survive in the competitive market.

More additional services are available as mobile phones gradually become a ubiquitous tool in our daily life. Designs of a mobile phone are also diversified for the purposes of satisfying the needs of telecommunications and increasing competitiveness of the mobile phone company in the market. In brief, the traditional function oriented design has gradually changed into a design focusing on novelty and being visually aesthetic so as to gain popularity among vast consumers.

Figure 1:
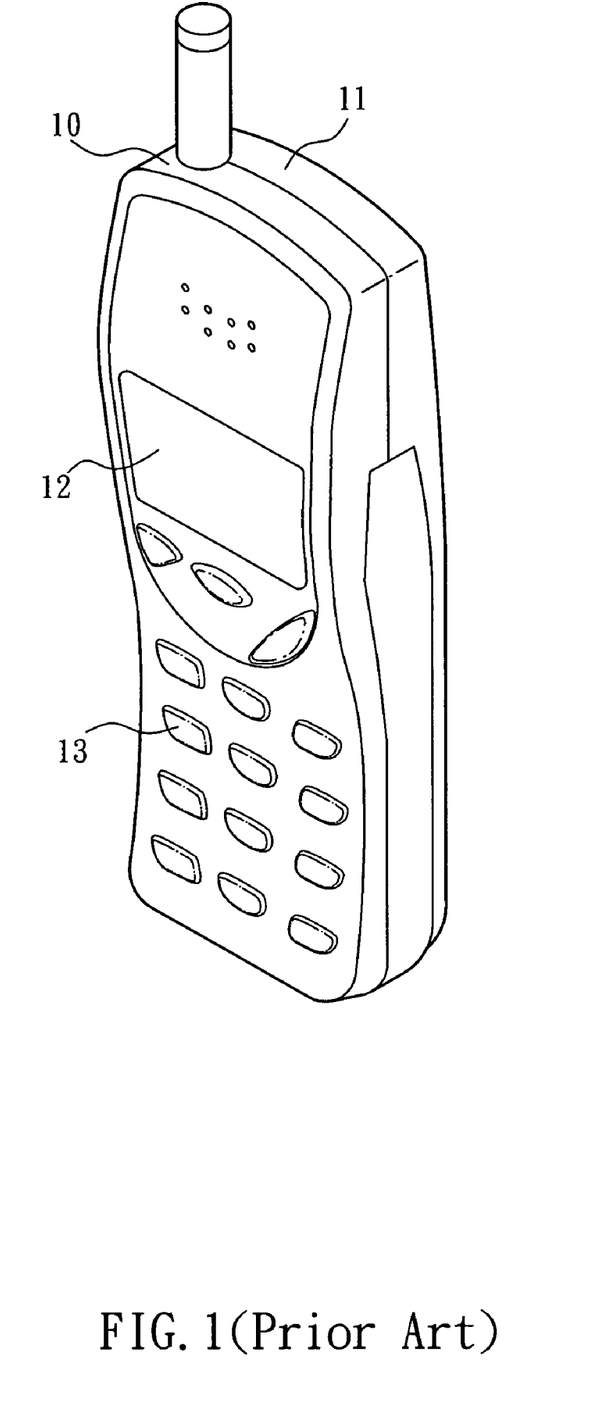
FIG. 1 is a perspective view of a conventional mobile phone.

A conventional mobile phone is shown in FIG. 1 and comprises a first half body 10 and a second half body 11. On a surface of the first half body 10 there are an upper display 12 and a lower alphanumeric keypad 13 both being typical components of a mobile phone. In use, a person may press keys of the keypad 13 to make a call or perform other operations. The person may also view messages shown on the display 12. Such mobile phones are ordinary types.

Figure 2:
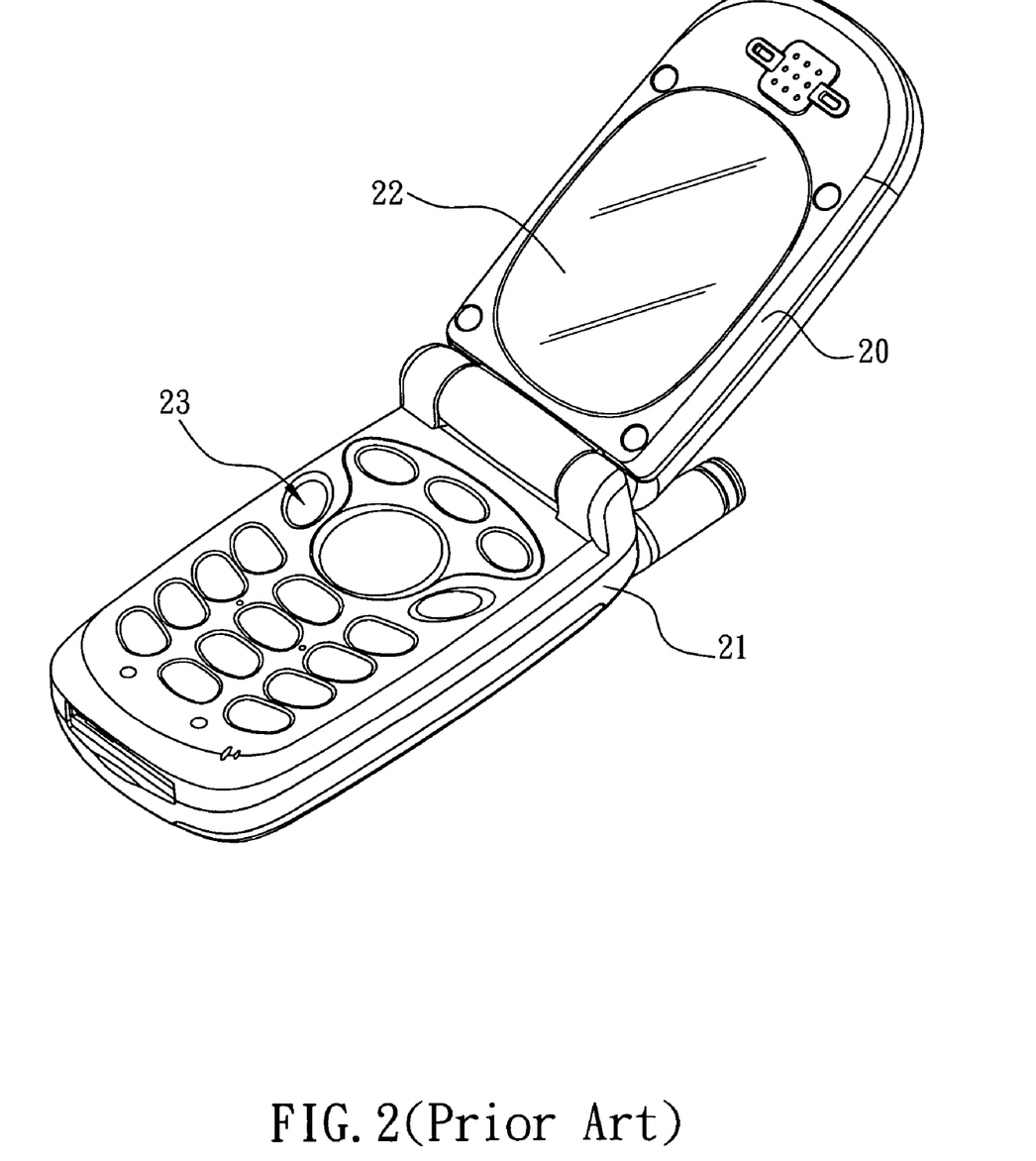
FIG. 2 is a perspective view of another conventional mobile phone in its open position.

Another conventional mobile phone as an improvement of the mobile phone of FIG. 1 for preventing keys of the keypad 13 from being depressed inadvertently is shown in FIG. 2. The mobile phone comprises a body 21 and a cover 20 having one end hinge connected to a top end of the body 21 such that the other end of the cover 20 is adapted to engage with a bottom end of the body 21 by pivoting about the hinge toward the body 21. As a result, an inner surface of the cover 20 is closed onto a front surface of the body 21. That is, a display 22 on the inner surface of the cover 20 is engaged with a keypad 23 on the front surface of the body 21. The mobile phone is thus in an inoperative position. To the contrary, the other end of the cover 20 is adapted to pull away from the bottom end of the body 21 by pivoting about the hinge away from the body 21. As such, both the keypad 23 and the display 22 are seen and the mobile phone is thus in an operative position.

Figure 3:
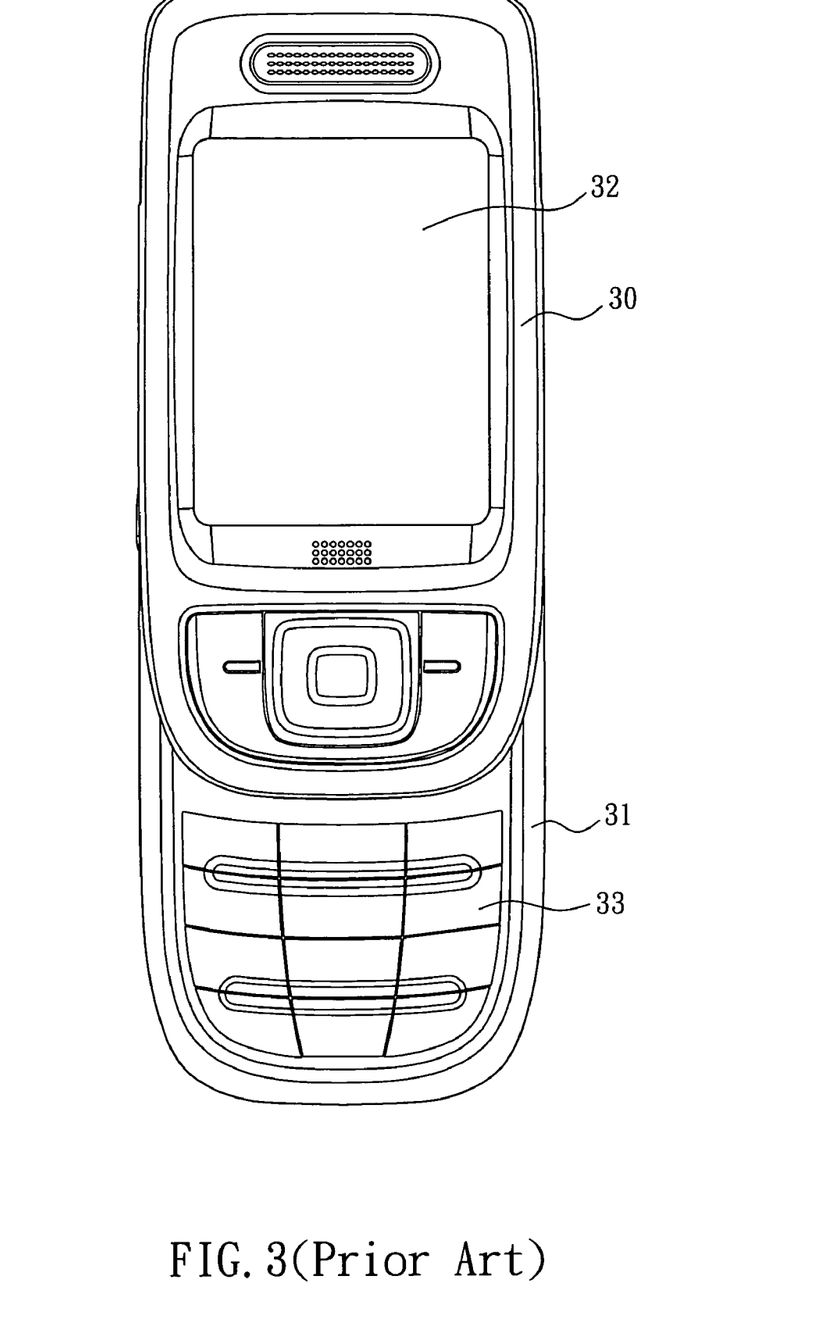
FIG. 3 is a front plan view of a further conventional mobile phone in its open position.

A further conventional mobile phone is shown in FIG. 3 as a design variation of the mobile phone shown in FIG. 2. The mobile phone comprises a body 31 and a cover 30 slidably provided on the body 31. The cover 30 comprises a display 32 provided on its front surface. The body 31 comprises an alphanumeric keypad 33 provided on a lower portion of a front surface thereof. The mobile phone is in an inoperative position (i.e., incapable of making a call or performing other operations) when the cover 30 slides down to conceal the keypad 33. To the contrary, the mobile phone is in an operative position (i.e., capable of making a call or performing other operations) when the cover 30 slides up to expose the keypad 33.

Above three types of mobile phone are most often available in the market. Designs of modern mobile phones are substantially minor improvements or modifications of the above mobile phones. That is, designs of modern mobile phones are limited to the above three types. No breakthroughs have been made so far as the present inventor is aware. Thus, it is desirable among manufacturers of the art and consumers to provide a novel mobile phone having a construction completely different from the above three types in order to overcome the inadequacy of the prior art.

SUMMARY OF THE INVENTION

After considerable research and experimentation, a mobile phone according to the present invention has been devised so as to overcome the above drawback (i.e., no design breakthrough) of the prior art.

It is an object of the present invention to provide a mobile phone comprising a body and a housing. A hollow is formed within the housing and the body is slidably disposed in the hollow. The hollow has an opening in an end of the housing and the other end terminated at a closed end of the housing distal the opening. A display (e.g., LCD (liquid crystal display)) is disposed on a front surface of the housing and is adapted to show messages. The body comprises a circuit board and an input device. The circuit board is installed within the body and comprises electronic circuits and devices for controlling the components of the housing, the display, the body, and the input device. The input device (e.g., alphanumeric keypad) is disposed on a front surface of the body. A user may press keys of the input device for operating the mobile phone. In operation, the body is capable of being engaged with the housing, capable of being slidably installed into the hollow through the opening, and capable of being slid towards outside of the hollow through the opening to expose the input device for a user to make a call by means of the mobile phone.

The above and other objects, features and advantages of the present invention will become apparent from the following detailed description taken with the accompanying drawings.

DETAILED DESCRIPTION OF THE PREFERRED EMBODIMENTS

Figure 4:
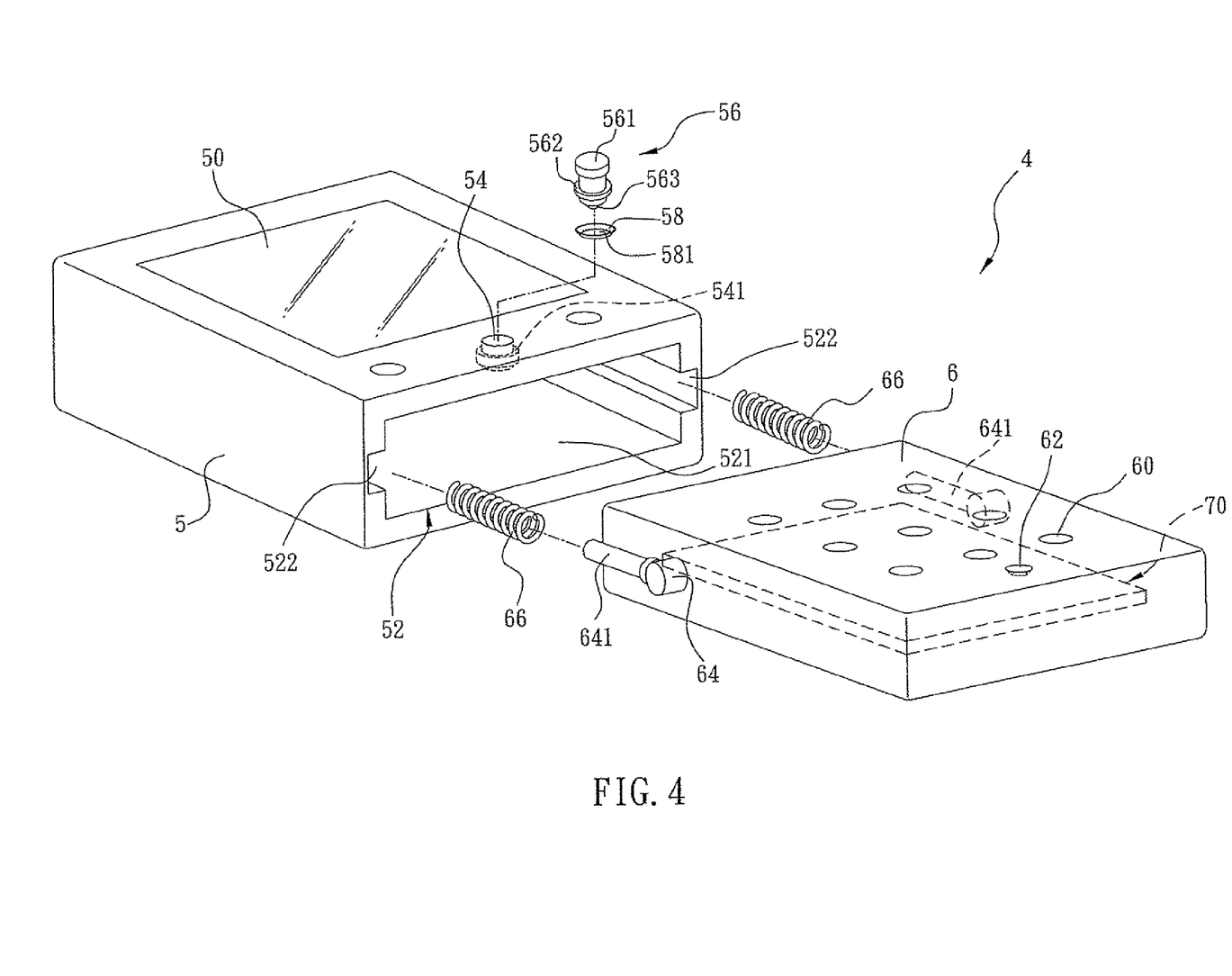
FIG. 4 is an exploded view of a first preferred embodiment of mobile phone according to the invention.
Figure 5:
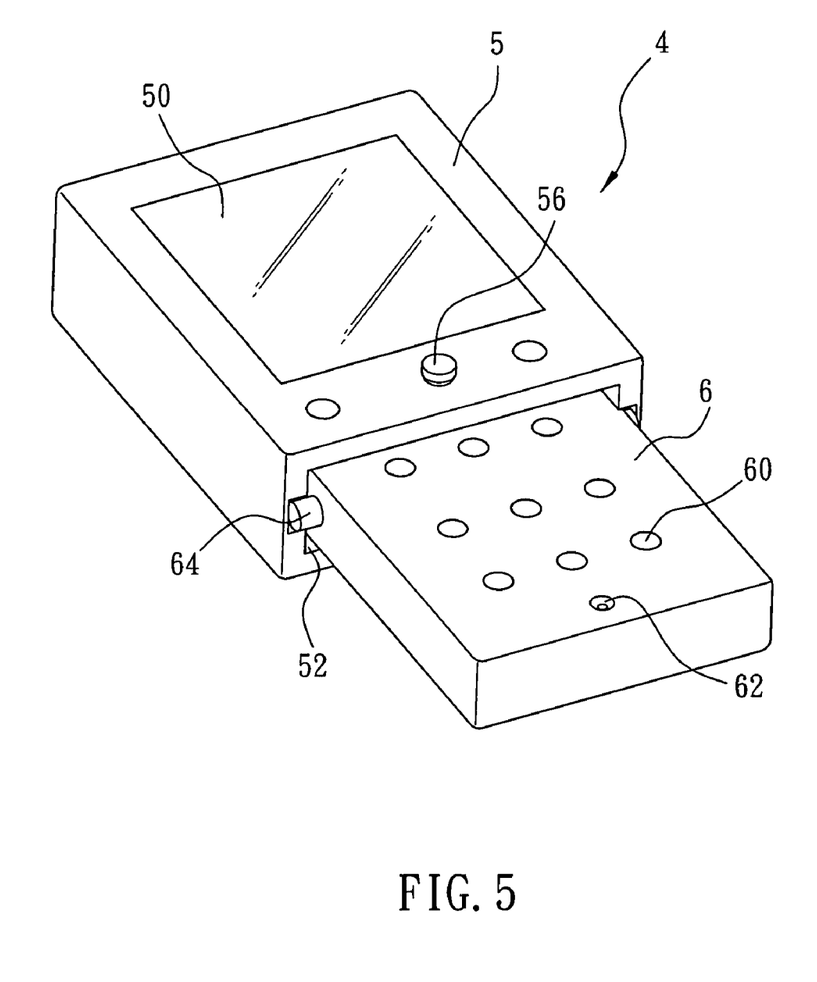
FIG. 5 is a perspective view of the assembled mobile phone in FIG. 4.

Referring to FIGS. 4 and 5, a mobile phone 4 in accordance with a first preferred embodiment of the invention comprises a rectangular housing 5 and a rectangular body 6. Each component is discussed in detailed below.

A display (e.g., LCD (liquid crystal display)) 50 is provided on a front surface of the housing S and is adapted to show messages. A hollow 52 is formed within the housing 5 and has an opening 521 in an end of the housing 5. The hollow 52 has a blind interior terminating at a closed end of the housing S distal the opening 521. The body 6 comprises a circuit board 70 and an input device (e.g., alphanumeric keypad) 60, wherein the input device 60 is disposed on a front surface of the body 6 and the body 6 is capable of being engaged with the housing 5, capable of being slidably installed into the hollow 52 through the opening 521 and capable of being slid towards outside of the hollow 52 through the opening 521 to expose the input device 60 for a user to press keys of the input device 60 for operating the mobile phone 4. The circuit board 70 is installed within the body 6 and includes electronic circuits and devices for controlling the components of the housing 5, the body 6, the display 50 and the input device 60. After the body 6 is slid towards outside of the hollow 52 into a position through the opening 521 where the body 6 is still engaged with the housing S and the input device 60 is revealed, the body 6 comprising the circuit board 70 is capable of being operated by using the input device 60. As an end, a user may make a call by means of the mobile phone 4.

Figure 6:
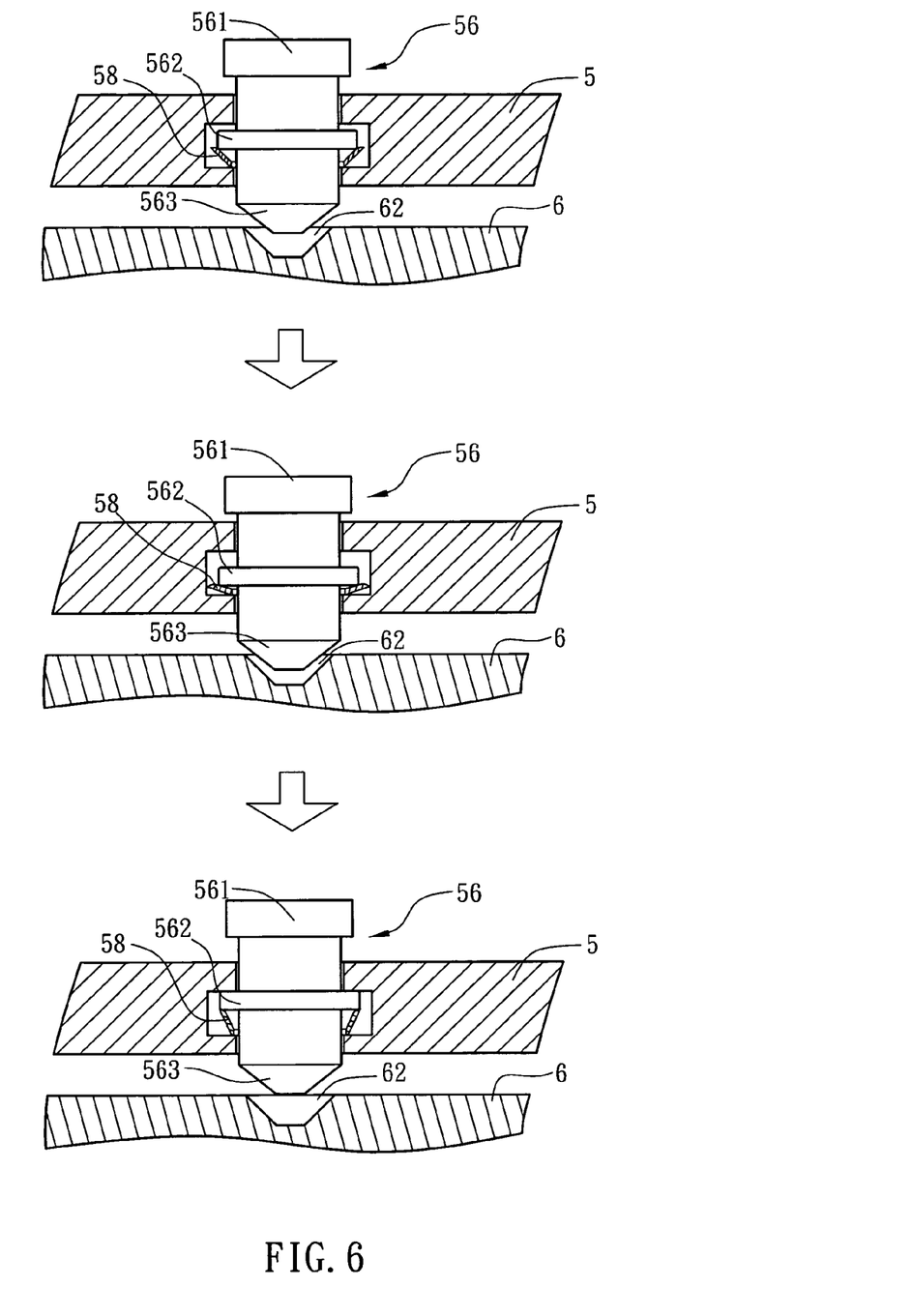
FIG. 6 is a sectional view of FIG. 5 showing three phases of operating the lock device.

Referring to FIG. 6 in conjunction with FIG. 4, in the first preferred embodiment of the invention the housing 5 further comprises a through hole 54 and a lock device 56. The through hole 54 is disposed near the opening 521 in the housing 5 and penetrating through from the front surface of the housing 5 to the hollow 52. An internal trough 541 is formed in the through hole 54. The lock device 56 is placed within the through hole 54 and stretches from outside of the housing 5 into the hollow 52. The bar-shaped lock device 56 comprises an enlarged head 561, an annular flange 562, and an inverted-conic bottom tip 563. The enlarged head 561 is disposed on an end of the locking device 56 intended to be located outside of the housing 5. A user may press the head 561. The flange 562 is disposed around an intermediate portion of the locking device 56 in the internal trough 541, and contained within the internal trough 541 so as to lock the locking device 56 within the through hole 54. Thus, movement of the lock device 56 is limited by the internal trough 541 and the lock device 56 is prevented from pulling out of the through hole 54. The bottom tip 563 is disposed on the other end of the lock device 56 and is intended to matingly engage with a conformed recess 62 formed on the front surface of the body 6. As a result, the body 6 is locked by the lock device 56 when the body 6 is disposed in the hollow 52.

Referring to FIGS. 4 and 6 again, in the first preferred embodiment a resilient ring 58 is provided in the internal trough 541 near the hollow 52. The resilient ring 58 comprises a central hole 581 for permitting the bottom tip 563 to pass through until the flange 562 presses the resilient ring 58. The resilient ring 58 is flexibly provided between a bottom of the internal trough 541 and the flange 562. Thus, the flange 562 is adapted to move between a top of the internal trough 541 and the resilient ring 58. The flange 562 moves inwardly to press the resilient ring 58 when the lock device 56 is pressed. The resilient ring 58 thus deforms flexibly to urge against the bottom of the trough 541. To the contrary the resilient ring 58 returns to its original shape by having its outer edge lift the flange 562 until the flange 562 contacts the top of the internal trough 541 in response to releasing the lock device 56. Also, the bottom tip 563 clears the recess 62. As a result, the body 6 is not locked by the bottom tip 563. Then the body 6 is adapted to pull away from the housing 5 by sliding outwardly. Moreover, the resilient ring 58 has returned to its original shape since the resilient ring 58 has contracted toward the flange 562.

Referring to FIGS. 4 and 5 again, in the first preferred embodiment two opposite, projecting sliding blocks 64 are disposed on two sides of the body 6 for engaging with the housing. Two grooved rails 522 are disposed on two sides of the hollow 52 corresponding to the two sides of the body 6, such that the sliding blocks 64 are capable of sliding along the grooved rails 522. Besides, the grooved rails 522 stretch from a bottom of the hollow 52 terminated by the housing 5 to the opening 521. The sliding blocks 64 slide to dispose at the opening 521 when the body 6 pulls away from the hollow 52 through the opening 521. As a result, a portion of the body 6 is exposed.

Referring to FIGS. 4 and 5 again, in the first preferred embodiment two bars 641 are respectively disposed on the two sliding blocks 64 in a direction parallel to the grooved rails 522, Two elastic elements (e.g., springs) 66 are respectively put around the two bars 641. The first ends of the elastic elements 66 prop against the sliding block 64 and the second ends of the elastic elements 66 prop against the closed end of the hollow 52. The body 6 is automatically pulled away from the hollow 52 through the opening 521 by the stretching force of the energized elastic elements 66 in response to disengaging the bottom tip 563 with the recess 62. As a result, a portion of the body 6 is capable of being exposed outside of the housing 5 in response to a stretched state of the elastic elements 66

Figure 7:
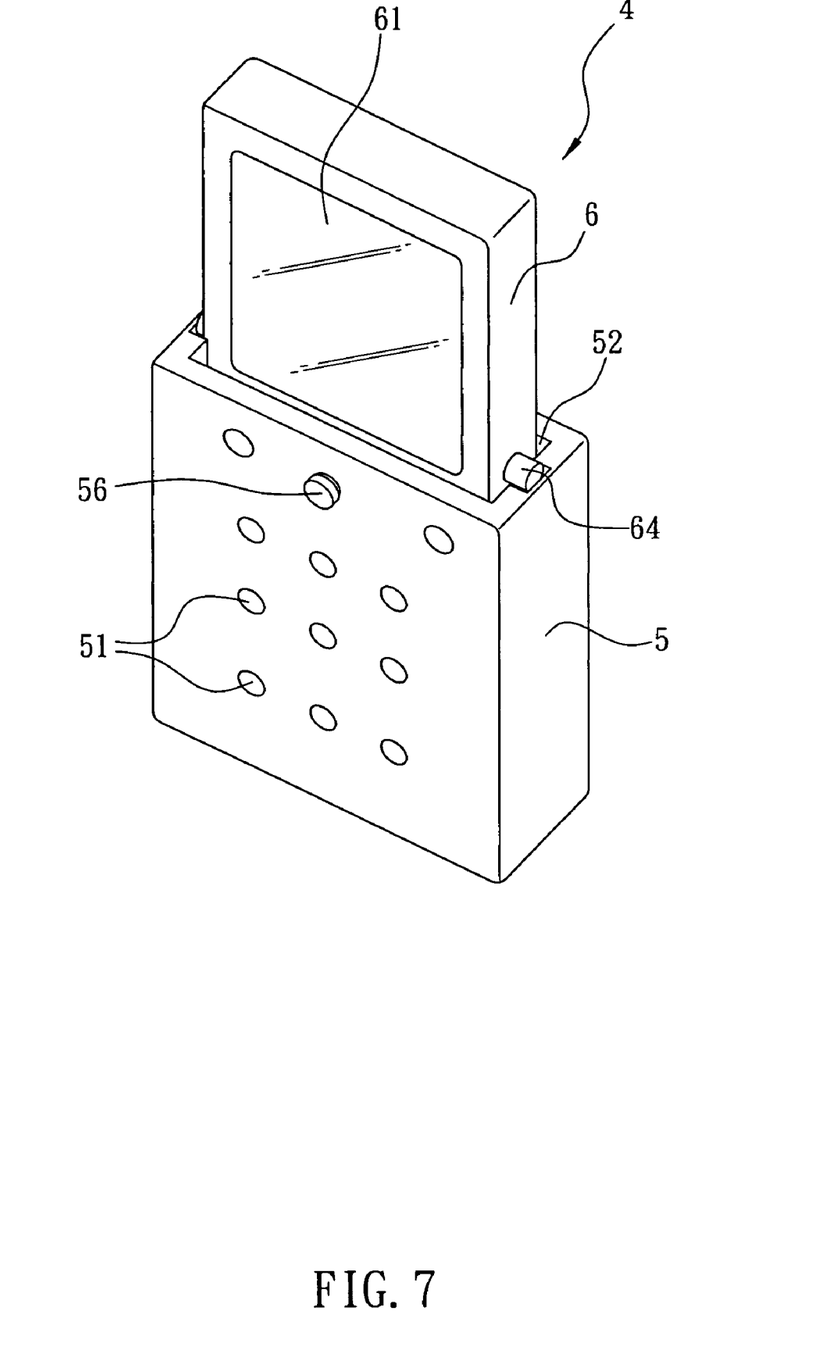
FIG. 7 is a perspective view of a second preferred embodiment of mobile phone according to the invention.

Referring to FIG. 7, a mobile phone in accordance with a second preferred embodiment of the invention is shown. The mobile phone 4 comprises a rectangular housing 5 and a rectangular body 6. An input device (e.g., alphanumeric keypad) 51 is disposed on a front surface of the housing 5. A user may press keys of the input device 51 for operating the mobile phone 4. A hollow 52 is formed within the housing 5 and has an opening 521 in the housing 5. The body 6 is capable of being engaged with the housing 5, capable of being slidably installed into the hollow 52 through the opening 521, and capable of being slid towards outside of the hollow 52 through the opening 521. The body 6 comprises a circuit board (not shown) and a display (e.g., LCD (liquid crystal display)) 61. The circuit board is installed within the body 6 and comprises electronic circuits and devices for controlling the components of the housing 5, the display 61, the body 6, and the input device 51. The display 61 is disposed on a front surface of the body 6 and is adapted to show messages. A user can view messages shown on the display 61 when a portion of the body 6 projects out of the housing 5.

While the invention herein disclosed has been described by means of specific embodiments, numerous modifications and variations could be made thereto by those skilled in the art without departing from the scope and spirit of the invention set forth in the claims.

What is claimed is:

1. A mobile phone comprising:
 a housing including a hollow formed therein, wherein the hollow has an opening in an end of the housing;

a display disposed on a front surface of the housing;
a body movably engaged with the housing for being slidably moved into the hollow through the opening or being slidably moved towards outside of the hollow through the opening;
an input device disposed on a front surface of the body, which is exposed outside of the hollow when the body is moved towards outside of the hollow;
a circuit board installed within the body and operated by the input device, which includes electronic circuits and elements for controlling components of the housing, the display, the body, and the input device;
a through hole penetrating the housing from the front surface thereof to the hollow, which includes an internal trough formed therein;
a locking device installed within the through hole, which has one end extending to the outside of the housing and another end extending to the hollow, which comprises:
an enlarged head disposed on the end of the locking device and extending to the outside of the housing;
a flange disposed around an intermediate portion of the locking device and movably contained within the internal trough; and
a bottom tip disposed on the another end of the locking device and extending to the hollow, wherein the bottom tip engages with a locking trough formed on the front surface of the body when the body is fully moved into the hollow and the enlarged head is depressed; and
a resilient ring movably contained within the internal trough at a position near the hollow, which includes a central hole being passed through the bottom tip and is pressed by the flange;
whereby, when the enlarged head is fully depressed and the flange presses a against the resilient ring, the resilient ring is deformed and then recovered to press the flange backward and move the locking device to release the bottom tip from the locking trough.

2. The mobile phone of claim 1, further comprising two sliding blocks disposed on two sides of the body for engaging with the housing, and two grooved rails disposed on two sides of the hollow corresponding to the two sides of the body, such that the sliding blocks are capable of sliding along the grooved rails.

3. The mobile phone of claim 2, wherein the grooved rails extend from an end of the hollow away from the opening.

4. The mobile phone of claim 2, further comprising two bars respectively disposed on the two sliding blocks in a direction parallel to the grooved rails, and two elastic elements respectively put around the two bars, wherein first ends of the elastic elements prop against the sliding blocks and second ends of the elastic elements prop against the end of the hollow such that a portion of the body is exposed outside of the hollow in response to a stretched state of the elastic elements.

5. A mobile phone comprising:
a housing including a hollow formed therein, wherein the hollow has an opening in an end of the housing;
an input device disposed on a front surface of the housing;
a body movably engaged with the housing for being slidably moved into the hollow through the opening or being slidably moved towards outside of the hollow through the opening;
a display disposed on a front surface of the body, which is exposed outside of the hollow when the body is moved towards outside of the hollow;
a circuit board installed within the body and operated by the input device, which includes electronic circuits and elements for controlling components of the housing, the display, the body, and the input device;
a through hole penetrating the housing from the front surface thereof to the hollow, which includes an internal trough formed therein;
a locking device installed within the through hole, which has one end extending to the outside of the housing and another end extending to the hollow, which comprises:
an enlarged head disposed on the end of the locking device and extending to the outside of the housing;
a flange disposed around an intermediate portion of the locking device and movably contained within the internal trough; and
a bottom tip disposed on the another end of the locking device and extending to the hollow, wherein the bottom tip engages with a locking trough formed on the front surface of the body when the body is fully moved into the hollow and the enlarged head is depressed; and
a resilient ring movably contained within the internal trough at a position near the hollow, which includes a central hole being passed through by the bottom tip and is pressed by the flange;
whereby when the enlarged head is fully depressed and the flange presses against the resilient ring, the resilient ring is deformed and then recovered to press the flange backward and move the locking device to release the bottom tip from the locking trough.

6. The mobile phone of claim 5, further comprising two sliding blocks disposed on two sides of the body for engaging with the housing, and two grooved rails disposed on two sides of the hollow corresponding to the two sides of the body, such that the sliding blocks are capable of sliding along the grooved rails.

7. The mobile phone of claim 6, wherein the grooved rails extend from an end of the hollow away from the opening.

8. The mobile phone of claim 6, further comprising two bars respectively disposed on the two sliding blocks in a direction parallel to the grooved rails, and two elastic elements respectively put around the two bars, wherein first ends of the elastic elements prop against the sliding blocks and second ends of the elastic elements prop against the end of the hollow such that a portion of the body is exposed outside of the hollow in response to a stretched state of the elastic elements.

* * * * *